UNITED STATES PATENT OFFICE.

WILHELM ACKERMANN, OF GIEBICHENSTEIN, NEAR HALLE-ON-THE-SAALE, ASSIGNOR TO THE GRABAU'S ALUMINIUM-WERKE, OF TROTHA, NEAR HALLE-ON-THE-SAALE, GERMANY.

PROCESS OF MAKING ALUMINUM FLUORID.

SPECIFICATION forming part of Letters Patent No. 513,971, dated February 6, 1894.

Application filed December 23, 1892. Serial No. 456,150. (No specimens.) Patented in Belgium August 20, 1892, No. 101,023, and in Germany December 11, 1892, No. 70,155.

*To all whom it may concern:*

Be it known that I, WILHELM ACKERMANN, chemist, a subject of the German Emperor, residing at Giebichenstein, near Halle-on-the-Saale, Germany, have invented certain new and useful Improvements in and Relating to the Production of Solutions of Fluorid of Aluminum Free from Iron, (for which I have obtained Letters Patent in Belgium, dated August 20, 1892, No. 101,023, and in Germany, dated December 11, 1892, No. 70,155;) and I do hereby declare the following to be a full, clear, and exact description of the invention.

My invention has relation to the production of solutions of fluorid of aluminum free from iron, and it has for its object a process whereby such solutions may be readily obtained.

In order to remove iron (when present in a ferric state) from solutions of aluminum fluorid I proceed as follows: The solution of fluorid of aluminum which may contain about fifteen per cent. by weight of the fluorid $(Al_2Fl_6)$ is first treated with hydrosulfuric acid for the purpose of eliminating the lead, arsenic, and other like substances from the solution, and for the purpose of converting the oxid of iron into a protoxid. Although I prefer to employ hydrosulfuric acid, this is not absolutely necessary, as other suitable chemicals may be used for the purpose of reducing the oxid of iron. The solution is then filtered and acidulated by means of a suitable acid, preferably hydrofluoric acid to such an extent that a test with tropæolin will give a red color, otherwise traces of iron sulfid would precipitate were a neutral solution subsequently cooled. The acidulated solution is then introduced into a vessel provided with an aluminum lining and cooled, while being agitated, whereupon the hydrous crystalline aluminum fluorid $(Al_2Fl_6,18H_2O)$ separates of itself. Under certain circumstances it is, however advisable to add the crystallized salt to the solution in small proportions. In fact, a trace of it will be sufficient, for the purpose of causing crystallization to set in. As soon as the crystallization of the salt commences the temperature of the solution rises, and it is necessary to cool the solution, and when, by continued cooling the temperature has been lowered to 0° centigrade, the crystallization is completed. The thick crystalline magma so obtained may be freed from most of the mother liquor in any suitable manner, as for instance in a centrifugal machine, and the remaining mother liquor can then be removed by immersing or washing the crystalline product in ice cold water. The aluminum fluorid so obtained is free from iron, but if the oxid of iron had not been reduced as described before crystallization, considerable proportions of iron would have combined with the crystalline aluminum fluorid in the form of iron fluorid. The crystalline aluminum fluorid may be readily rendered anhydrous by removal of the water combined therewith or contained thereby.

Having thus described my invention, what I claim as new therein, and desire to secure by Letters Patent, is—

1. The mode of removing iron from fluorid of aluminum solutions when said iron is present in a ferric state, which consists in converting the iron into a ferrous combination and separating the aluminum fluorid from the solution.

2. The mode of removing iron from fluorid of aluminum solutions when said iron is present in a ferric state, which consists in converting the iron into a ferrous combination by means of a suitable acid, and separating the aluminum fluorid from the solution.

3. The mode of removing iron from fluorid of aluminum solutions when said iron is present in a ferric state, which consists in converting the iron into a ferrous combination by means of hydrosulfuric acid, and separating the aluminum fluorid from the solution.

4. The mode of removing iron from fluorid of aluminum solutions when said iron is present in the ferric state, which consists in converting the iron into a ferrous combination and separating the aluminum fluorid by crystallization.

5. The mode of removing iron from fluorid of aluminum solutions when said iron is present in a ferric state, which consists in converting the iron into a ferrous combination and crystallizing out the fluorid of aluminum by cooling.

WILHELM ACKERMANN.

Witnesses:
RICHARD SCHMIDT,
PAUL LOUBIER.